(12) United States Patent
Denissen et al.

(10) Patent No.: US 9,093,257 B2
(45) Date of Patent: Jul. 28, 2015

(54) SEALING COMPOUND AND CERAMIC DISCHARGE VESSEL COMPRISING SUCH SEALING COMPOUND

(75) Inventors: Cornelis Johannes Maria Denissen, Nuth (NL); Martinus Joseph Maria Kessels, Nederweert (NL); Ton Reinier Mulderij, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/114,955

(22) PCT Filed: Apr. 27, 2012

(86) PCT No.: PCT/IB2012/052107
§ 371 (c)(1),
(2), (4) Date: Oct. 31, 2013

(87) PCT Pub. No.: WO2012/153226
PCT Pub. Date: Nov. 15, 2012

(65) Prior Publication Data
US 2014/0062295 A1    Mar. 6, 2014

(30) Foreign Application Priority Data
May 6, 2011   (EP) .................................. 11165101

(51) Int. Cl.
*H01J 61/36* (2006.01)
*H01J 9/00* (2006.01)
*B23K 35/36* (2006.01)
*H01J 9/26* (2006.01)

(52) U.S. Cl.
CPC ............. *H01J 61/366* (2013.01); *B23K 35/361* (2013.01); *H01J 9/265* (2013.01)

(58) Field of Classification Search
None
See application file for complete search history.

(56) References Cited

U.S. PATENT DOCUMENTS

| | | | |
|---|---|---|---|
| 5,424,609 A * | 6/1995 | Geven et al. | 313/623 |
| 6,365,285 B1 | 4/2002 | Chesnes | |
| 2002/0170633 A1 | 11/2002 | Uchida | |
| 2005/0200281 A1* | 9/2005 | Belder et al. | 313/626 |
| 2009/0267515 A1* | 10/2009 | Hendricx et al. | 313/636 |
| 2009/0269523 A1 | 10/2009 | Wei | |

FOREIGN PATENT DOCUMENTS

| | | |
|---|---|---|
| EP | 0215524 A1 | 3/1987 |
| EP | 1367635 A2 | 12/2003 |
| WO | 03096377 A1 | 11/2003 |
| WO | 2008075273 A1 | 6/2008 |

* cited by examiner

Primary Examiner — Ashok Patel

(57) ABSTRACT

Disclosed is a lamp comprising a ceramic discharge vessel (3) with end parts (34) and with electrodes (4) which are connected to a respective external contact via a respective feedthrough (20). Each feedthrough is sealed with a sealing part (40) thereof by a sealing compound (10) in the end part. The discharge vessel gastightly encloses a discharge space into which said two electrodes extend from the end part and which contains an ionizable filling. The sealing compound comprises at least one first component chosen from the group consisting of ruthenium (Ru), iridium (Ir), osmium (Os) and rhenium (Re), and comprises at least one second component chosen from the group consisting of silicium (Si), boron (B), phosphor (P). Thus, a halide resistant lamp vessel is obtained exhibiting excellent lifetime characteristics and long lifetimes.

15 Claims, 5 Drawing Sheets

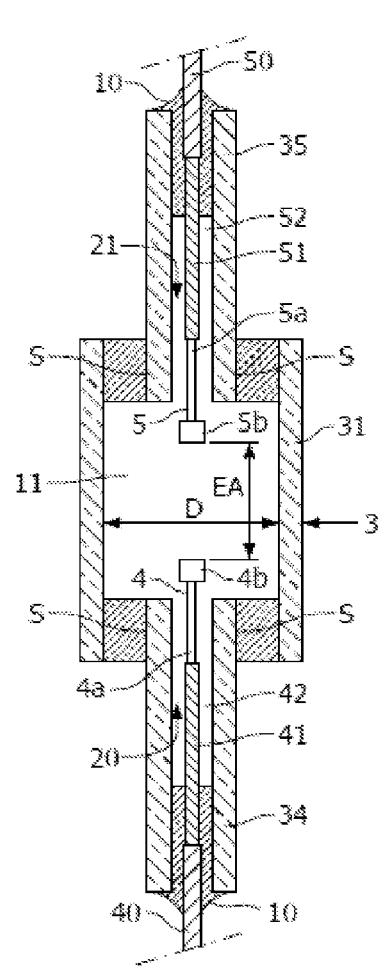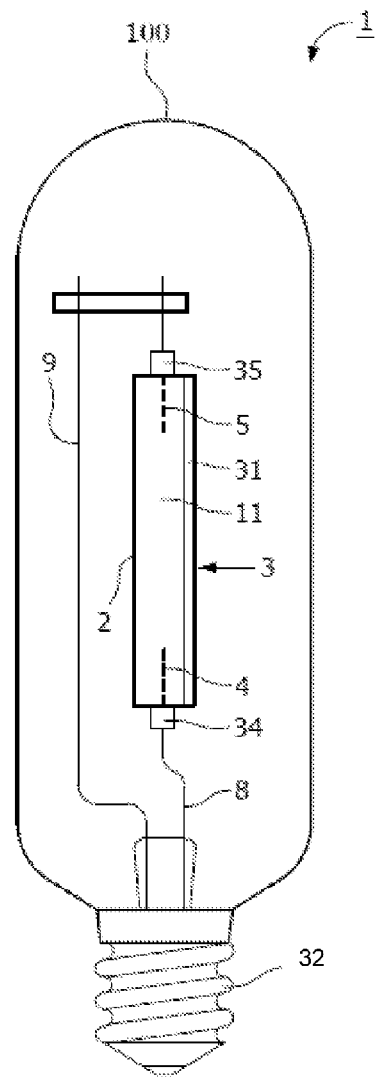
FIG. 1
(prior art)
FIG. 2

SEALING COMPOUND AND CERAMIC DISCHARGE VESSEL COMPRISING SUCH SEALING COMPOUND

CROSS-REFERENCE TO PRIOR APPLICATIONS

This application is the U.S. National Phase application under 35 U.S.C. §371 of International Application No. PCT/IB2012/052107, filed on Apr. 27, 2012, which claims the benefit of European Patent Application No. 11165101.4, filed on May 6, 2011. These applications are hereby incorporated by reference herein.

FIELD OF THE INVENTION

The invention relates to a discharge vessel comprising a ceramic body enclosing a discharge space provided with an ionizable filling, the discharge space being sealed in a gastight manner with a sealing compound. The invention further relates to an electric lamp, a sealing compound and use of a sealing compound.

BACKGROUND OF THE INVENTION

Metal halide lamps comprising a discharge vessel comprising a ceramic body are known in the art and are described in, for instance, US2009/0269523 and EP215524. Such lamps operate under high pressure and comprise ionizable gas fillings of, for instance, NaI (sodium iodide), TlI (thallium iodide), $CaI_2$ (calcium iodide) and $REI_3$. $REI_3$ refers to rare-earth iodides. Characteristic rare-earth iodides for metal halide lamps are $CeI_3$, $PrI_3$, $NdI_3$, $DyI_3$ and $LuI_3$ (cerium, praseodymium, neodymium, dysprosium and lutetium iodide, respectively). Typically said ceramic body is made of translucent gastight (poly) crystalline alumina (TGA), aluminumnitride, or yttrium-aluminum-garnet.

There is a continuous effort in industry to optimize such lamps and their production process. Lifetime and energy-saving aspects of the lamps as well as reduction of costs involved in the production process of the lamp are items that are investigated.

One specific item of interest is the lifetime of the lamp. Substantially long lifetimes are desired, without, however, a substantial change of lamp characteristics. Another item of interest is, for instance, the reduction of costs during the production process. For instance, lowering the heating temperature during a sealing step in the production process, for example of sealing a feedthrough with its sealing part in an end part, might be of interest in view of saving costs. In the present production process of metal halide lamps, the lamps are sealed at relatively high temperatures. A reduction of heating time and/or heating temperature would be beneficial for the apparatus used for performing such a sealing step, but might also be beneficial for the lifetime of the lamp (less risk of crack formation).

A further specific item of interest to increase said lifetime is matching the thermal coefficient of expansion of the material of the seal with the material to seal, for example with the material of the sealing part and/or the ceramic material of the discharge vessel. In general, the better the match, the longer the lifetime and/or the less risk of defective lamps in modern lamp production processes of large quantities on an industrial scale. A better match will also reduce the risk of crack formation. Though Niobium is not very well resistant against the metal halide filling, Niobium is yet selected in the known lamp as sealing part because it has a coefficient of linear thermal expansion corresponding to that of the translucent sintered $Al_2O_3$ ceramic material of the discharge vessel, i.e. $7.3*10^{-6}K^{-1}$ respectively $7.0*10^{-6}K^{-1}$ (at 300K). Said sealing part is sealed and completely covered with a sealing compound into the respective end part of the lamp.

It is a disadvantage of the known lamp that both the sealing compound is not resistant against the metal halide filling, resulting in the disadvantage of the known lamp to be relatively long due to its long end parts, also called extended plug (or vup). The long end parts are desired as to keep the sealing compound at a relatively low temperature and thus to slow down the chemical attack process by the filling and to improve the stability of lamp characteristics and/or to extend the lifetime of the lamp.

In an alternative embodiment of the known lamp, as disclosed in WO2008075273, the sealing part is made of Iridium metal which is directly sealed to the ceramic material of the end part via shrink sealing. An improved resistance of the feedthrough construction against the corrosive metal halide filling is obtained as Iridium is resistant to said metal halide and the sealing compound is absent. However, this embodiment of the known lamp has the disadvantage that due to the shrink sealing process the Iridium has become (somewhat) brittle and less robust against shock, involving the disadvantage of an enhanced risk on short lifetime of the lamp. Moreover, Iridium metal is an expensive material rendering the lamp to be relatively expensive.

OBJECT AND SUMMARY OF THE INVENTION

It is an object of the invention to provide a lamp of the type of the opening paragraph in which at least one of the disadvantages of the known lamps is counteracted. Thereto the lamp of the opening paragraph is characterized in that the sealing compound comprises at least one first component chosen from a first group consisting of ruthenium (Ru), iridium (Ir), Osmium (Os), Rhenium (Re), and comprises at least one second component chosen from a second group consisting of silicon (Si), boron (B), phosphorus (P).Exemplary, these sealing compounds are brazing alloys. Typical compounds comprising both the first and second component are binary and ternary brazing alloys as iridium-boride ($Ir_yB_z$), ruthenium-silicide ($Ru_xSi_y$), ruthenium-phosphide ($Ru_xP_w$), and ruthenium-iridium-boride ($Ru_xIr_yB_z$). Lamps in which said compounds are used as sealing compound surprisingly showed relatively long lifetimes and excellent lifetime characteristics. These sealing compounds appear to have coefficients of linear thermal expansion close to that of the translucent sintered $Al_2O_3$ ceramic material of the discharge vessel. Moreover, it appeared that said sealing compounds are very well resistant against the (aggressive) metal halide filling. The at least one second component could range from a few atom %, for example 5 at % to a quite high amount, for example 50 at %. Too high amounts of the at least one second component, for example boron, should not be applied to avoid diffusion of (too much of) said second component into the ceramic discharge vessel, said diffusion involves the risk of less resistance to corrosion of the discharge vessel by the lamp filling. Hence, the amount of the at least one second component preferably is at the most 45 at %. On the other hand, the amount of the at least one second component preferably is at least be 10 at % to have a significant, preferred reduction in melting point of the brazing alloy, for example to enable the sealing glass to melt at an acceptable low temperature compared to the melting temperature of the at least one first component, i.e. at melting temperatures below 2000° C.

As said sealing compound is resistant to the (aggressive) ionizable filling at the relatively high temperatures at the wall during operation of the lamp, the sealing compound of the invention enables filling the discharge space via an opening in a wall of the discharge space and subsequently sealing said opening with the sealing compound. The seal thus formed being (about) flush with the inner and outer wall of the discharge vessel, rendering a compact discharge vessel with a relatively smooth wall of the discharge space and the discharge space is free from an (unintentionally) cold place at the seal. Alternatively, said sealing of said opening could be attained with a combination of the sealing compound and a ceramic/metal stopper, various designs are possible and envisaged. Thus discharge vessels which are suitable for induction lamps or dielectric barrier discharge lamps are enabled, i.e. for lamps in which are the electrodes are not disposed in the discharge space but rather are located on the outside of the wall. Alternatively, the conventional lamp construction, with electrodes arranged in the discharge space of a discharge lamp, is manufacturable, with the electrode mounted on a respective feedthrough which is sealed with the sealing compound in a respective end part, the end part being sealed to the ceramic body. Thus the simple manufacture of reliable, robust discharge vessels which are suitable for metal halide HID lamps, automotive HID lamps, high pressure sodium lamps and the like, are enabled.

In particular it appeared that sealing compounds with outstanding chemical resistance against the ionizable filling are the sealing compounds chosen from the group consisting of iridium-boride ($Ir_yB_z$), ruthenium-boride ($Ru_xB_z$) and ruthenium-iridium-boride ($Ir_yRu_xB_z$), with x+y+z=1 and with disregard of contaminations up to an impurity level of 0.05 at %, like for example Na and/or Al. By varying the ratio between the amount of first component and the second component amount, some relevant physical properties of the sealing compound of can be controlled, for example the coefficient of linear thermal expansion (relatively limited) and the melting point. For example, an amount of 10 at % B (boron) in Ir (iridium) results in a melting point of about 2200° C. of the brazing alloy, and an amount of 30 at % B in Ir results in a melting point of about 1600° C. of the brazing alloy, while the coefficient of linear thermal expansion remains about $7.0*10^{-6}K^{-1}$., i.e. varying only slightly between about $6.5$-$7.0*10^{-6}K^{-1}$ at 300K. The desired temperature for manufacture of the sealed feedthrough, for example in the range of 1650° C. to 1800° C. can be chosen by selection of said ratio between the amount of first component and the second component amount. Thus embrittlement of the sealing part, for example as occurs in the case of a direct shrink sealing of iridium in the ceramic discharge vessel at relatively high temperatures, i.e. at about 1850° C., is counteracted. As a good balance had to be found between the coefficient of linear thermal expansion, the chemical resistance and the melting temperature of the sealing glass, it appeared from experiments that in particular compounds with the composition $Ru_xB_z$, $Ir_yB_z$, and $Ru_xIr_yB_z$, and with z in the range of 20 at % to 35 at %, fulfill these requirements, for example sealing compounds as $Ir_{0.7}B_{0.3}$, $Ir_{0.8}B_{0.2}$, $Ru_{0.65}B_{0.35}$, or $Ru_{0.75}B_{0.25}$. Also Ru and/or Ir in combination with Si and/or P resulted in a comparable reduction of the melting point of Ir respectively Ru (or mixtures thereof, also with boron), and these compounds also showed good resistance against the ionizable filling at elevated temperatures as obtained during operation of the lamp. Hence, brazing alloys of, for example, $Ru_xSi_v$, $Ir_yP_w$, $Ru_xP_w$ (with v+w+x+y(+z)=1) could be equally applied with about the same effect/result as IrB- and RuB-compounds. Suitable brazing alloys with Osmium and Rhenium as the first component have the second component in the range of about 40 at %, for example $Os_{0.6}B_{0.4}$ and $Re_{0.58}B_{0.42}$, these compounds have melting temperatures of about 1700° C. and 1830° C. respectively. In general combinations according to the general formula $Ir_xRu_yOs_zRe_aB_bSi_vP_w$ with v+w+x+y+z+a+b=1 and with v+w+b in the range of 0.05 to 0.40 are found, and that are suitable sealing compounds.

Very suitable materials which can be used as material for the sealing part are chosen from the group consisting of niobium (Nb), molybdenum (Mo), rhenium (Re), tungsten (W), tantalum (Ta), and iridium (Ir). Molybdenum, niobium and tungsten are favorable with respect to the price of the material of the sealing part. Yet, for all these materials the mutual difference between the coefficient of linear thermal expansion the sealing part and the coefficient of linear thermal expansion of the ceramic discharge vessel is sufficiently small that the layer of the sealing compound is suitable to bridge said difference, for example a layer thickness of the sealing glass in the range of 50-250 μm, for example in the case of a Molybdenum sealing part the layer thickness is about 200 μm. In particular for niobium, rhenium and iridium as material for the sealing parts, the mutual difference in coefficient of linear thermal expansion is so small that only a relatively thin layer of sealing compound is required for the sealing, for example a layer of sealing compound in between 50-130 μm for a Niobium metal part with a diameter of about 650 μm, thus enabling a relatively compact discharge vessel. Preferably, over a temperature range of 25° to 300° C. the sealing compound has a coefficient of linear thermal expansion E in the range of $6.5*10^{-6}$ $K^{-1}<=E<=7.0*10^{-6}K^{-1}$ resulting in a relatively low mechanical stress at the interface between the feedthrough and the discharge vessel. Thus a discharge vessel with an improved bonding between the discharge vessel and the feedthrough is obtained, which is beneficial for the lifetime of a lamp comprising said discharge vessel. More preferably the sealing compound has a composition chosen such that the coefficient of linear thermal expansion E is in the range of $±0.5*10^{-6}K^{-1}$ the average of the coefficient of linear thermal expansion of the ceramic material of the discharge vessel and the coefficient of linear thermal expansion of the sealing part. Thus a sealing glass has a good intermediate coefficient of linear thermal expansion between the coefficients of linear thermal expansion of the ceramic discharge vessel and the sealing part, resulting in a more or less minimization of mechanical stresses between feedthrough and discharge vessel.

An embodiment of the discharge vessel according to the invention is characterized in that the discharge vessel is free from a crevice along the metallic part of the feedthrough. The excellent chemical resistance of the sealing glass enables the sealing glass being exposable to higher temperatures, hence being closer to the discharge arc, without resulting in lifetimes of the inventive discharge vessels being shorter than lifetimes of the known discharge vessel. Thus more compact but equally reliable discharge vessels are obtainable. It is then equally enabled to manufacture an embodiment of discharge vessel of the invention which is free from an extending plug at its end part, rendering the discharge vessel, and hence a lamp comprising said discharge vessel, yet to be even more compact.

In an embodiment the discharge vessel of the invention is characterized in that the metallic part is in one part and extends between the electrode and an external contact. Thus a relatively cheap discharge vessel and of a relatively simple construction is obtained.

The invention further relates to an electric lamp comprising at least two external, electrical contacts, and comprising a discharge vessel according to the invention, the discharge vessel comprising at least two electrodes, each electrode being connected to a respective of the external electrical contacts. The electrodes could either be arranged inside the discharge space or being provided on the outside of the wall of the discharge vessel. Embodiments of the lamp comprise feedthroughs which are in particular suitable in high pressure metal halide gas discharge lamps. In said lamps the feedthroughs are exposed to relatively high temperatures during operation of the lamp which pose high demands on the resistance of said feedthroughs to the (aggressive) ionizable filling of the lamp. It appeared that sufficient resistance to said filling is obtained by the feedthroughs (and lamps) according to the invention.

The invention yet further relates to a sealing compound comprising at least one first component chosen from a first group consisting of ruthenium (Ru), iridium (Ir), Rhenium (Re), Osmium (Os), and comprising at least one second component chosen from a second group consisting of silicon (Si), boron (B), phosphor (P), and further comprising at least a third component chosen from the first and/or second group.

Finally, the invention relates to use of a sealing compound according to the invention for sealing a discharge vessel.

BRIEF DESCRIPTION OF THE DRAWINGS

The invention will now be elucidated further, by way of example only, by means of the schematic drawing in which:

FIG. 1 is a schematic cross-sectional view of a discharge vessel according to the prior art;

FIG. 2 shows a side view of a lamp according to the invention;

DESCRIPTION OF EMBODIMENTS

Figure 3:
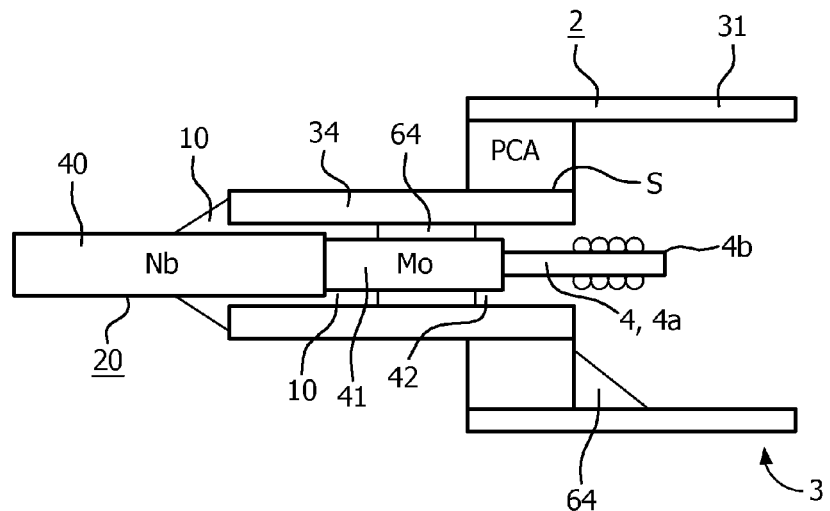
FIG. 3 is a schematic cross-sectional view of a first embodiment of a discharge vessel according to the invention.

A discharge vessel 3 according to the prior art is shown in FIG. 1, it has a ceramic wall 31 and is generally formed from a cylindrical part with an internal diameter D which is bounded at either end by a respective end part, i.e. a ceramic protruding plug 34,35, which is fastened in a gastight manner in the cylindrical part by means of a shrink sintered joint S. Each ceramic protruding plug 34,35 narrowly encloses a current feedthrough 20,21 of a relevant electrode 4,5 having electrode rods 4a, 5a which are provided with tips 4b, 5b, respectively. The two electrodes 4,5, for instance, tungsten electrodes, with their tips 4b, 5b at a mutual distance EA are arranged in a discharge space 11 so as to define a discharge path between them. Each electrode 4,5 extends inside the discharge vessel 3 over a length forming a tip-to-bottom distance between the discharge vessel wall 31 and the electrode tips 4b,5b.

Current feedthroughs 20,21 enter discharge vessel 3. Each current feedthrough 20,21 comprises a halide-resistant portion 41,51, in the known lamp in the form of a Mo-rod and a sealing part 40,50 which is fastened to a respective end plug 34,35 in a gastight manner by means of sealing compound 10 The sealing compound 10 in the known lamp is a glass ceramic system of $Al_2O_3$—CaO—BaO—MgO—$B_2O_3$.

Sealing compounds 10 extend over some distance, for instance, approximately 1 to 5 mm, over the Mo-rod 41,51 (during sealing, ceramic sealing material penetrates end plugs 34,35, respectively). It is possible for the parts 41,51 to be formed in an alternative manner instead of from a Mo-rod. Other possible constructions are known, for instance, a Mo coil-to-rod configuration. The parts 40,50 are made of a metal whose coefficient of linear expansion corresponds very well to that of the end plugs 34,35. Niobium (Nb) is chosen because this material has a coefficient of thermal expansion corresponding to that of the ceramic discharge vessel 3. Further is shown that crevices 42, 52 are present along the respective feedthroughs 20,21.

The lamp of the invention will be described with reference to FIGS. 2 to 5, wherein lamp and discharge vessels are schematically depicted and the current feedthrough conductors are sealed with two seals, respectively. However, the invention is not limited to such an embodiment. Embodiments herein comprise discharge vessels having one or two seals by means of a sealing material of the current leadthrough conductors to the discharge vessel according to the invention.

Referring to FIGS. 2, an embodiment of a discharge lamp 1 (not drawn to scale) according to the invention is shown, and is provided with a discharge vessel 3 having a ceramic ceramic body 2 with a wall 31 and two end parts, i.e. extending plugs 34,35, which encloses a discharge space 11 containing an ionizable filling. The ionizable filling may comprise, for instance, NaI, TlI, $CaI_2$ and $REI_3$ (rare-earth iodide). $REI_3$ refers to rare-earth iodides such as $CeI_3$, $PrI_3$, $NdI_3$, $DyI_3$, $HoI_3$, $TmI_3$, and $LuI_3$, but also includes Y (yttrium) iodides. Combinations of two or more rare-earth iodides may also be applied. The filling preferably comprises as rare-earth halide at least a cerium halide, such as $CeI_3$. Furthermore, the discharge space 11 may be free from Hg (mercury) or alternatively may contain Hg (mercury) and further contains a starter gas such as Ar (argon) or Xe (xenon). The ionizable filling may also comprise a rare-earth free ionizable filling, such as a filling comprising NaI, TlI and $CaI_2$. Such fillings are known in the art; the invention is not limited to these ionizable fillings; also other fillings may be applied. Lamp 1 is a high-intensity discharge lamp with two electrodes 4,5 extending from the end parts into the discharge space, each electrode being connected via a respective feedthrough (not shown in FIG.2) to a respective current supply conductor 8,9. The discharge vessel 3 and current supply conductors are enveloped by an outer envelope 100, for example made of hard glass, mounted in a socket 32 to which the electrical supply conductors are connected to a respective electrical contact thereof (not shown).

As is known to the person skilled in the art, sealings in this field usually comprise ceramic sealing materials. Such ceramic sealing materials are generally based on a mixture of oxides, which are pressed and sintered into a product in the form of a ring. The production of frit rings and the method of sealing is well known to the person skilled in the art and this method of sealing equally or similarly applies to the sealing material used to manufacture the lamp according to the invention.

Figure 4:
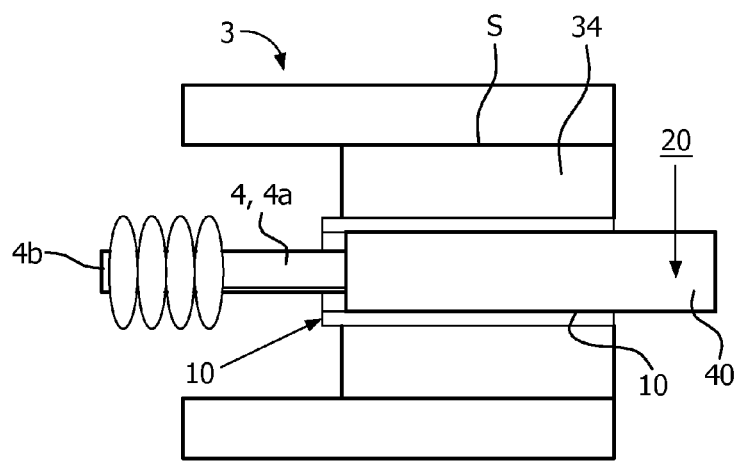
FIG. 4 is a schematic cross-sectional view of a second embodiment of a discharge vessel according to the invention.
Figure 5:
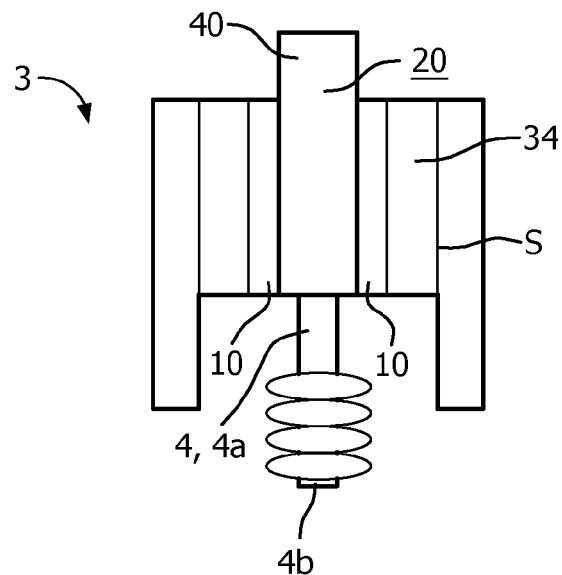
FIG. 5 shows a detailed view of a sealed feedthrough of a third embodiment of a discharge vessel according to the invention.

A detail of various embodiments of a discharge vessel 3 according to the invention are shown in FIGS. 3 to 5.

In particular in FIG. 3 is shown a part of the discharge vessel 3 comprising a ceramic body 2 with a ceramic wall 31 which is generally formed from a cylindrical part, but which can have other shapes, for example a bulb shape, which is bounded at either end by a respective end part, i.e. a ceramic plug 34, in FIG. 3 a protruding plug (or non-protruding as in FIGS. 4 and 5). Said plug 34 is fastened in a gastight manner in the cylindrical part by means of a shrink sintered joint S. The ceramic plug 34 narrowly encloses a current feedthrough 20 of a relevant electrode 4 having an electrode rod 4a, which is provided with a tip 4b. The current feedthrough 20 comprises a halide-resistant portion 41, in the lamp of FIG. 3 in the form of a Mo-rod onto which the electrode is mounted, and a sealing part 40 which is sealed in a respective end plug 34 in a gastight manner by means of sealing compound 10. The sealing compound in the embodiment of FIG. 3 is Iridium-boride, i.e. $Ir_{0.7}B_{0.3}$, having a melting point of about 1600° C. and a coefficient of linear thermal expansion of about $6.6*10^{-6}$ $K^{-1}$. The sealing compounds 10 extend over some distance, for instance, approximately 1 to 5 mm, over the Mo-rod 41 (during sealing, ceramic sealing material penetrates the end plug 34). The sealing part 40 is made of a metal whose coefficient of linear expansion corresponds very well to that of the end plugs 34. Niobium (Nb) is chosen because this material has a coefficient of thermal expansion corresponding to that of the ceramic discharge vessel 3. Further is shown that a crevices 42 is present along the feedthrough 20. The lamp has a an ionizable (salt) filling 64 which during operation is in a gaseous/vapor state, but which is condensated once the lamp has cooled down. Said salt filling usually condensates at the coldest locations directly accessible from the discharge space, i.e. in the crevices or in sharp, remote corners of the discharge space itself.

In FIG. 4 the discharge vessel 3 has as an end part a non-protruding plug 34. Said plug 34 is fastened in a gastight manner in the cylindrical part by means of a shrink sintered joint S. The ceramic plug 34 narrowly encloses a current feedthrough 20 of a relevant electrode 4 having an electrode rod 4a, which is provided with a tip 4b. The electrode is directly mounted on a sealing part 40 which is made of a metal whose coefficient of linear expansion corresponds very well to that of the end plugs 34, in this case Niobium (Nb), but alternatively Ruthenium (Ru) could be chosen, because these materials have a coefficient of thermal expansion corresponding to that of the ceramic discharge vessel 3. As Niobium is not very well resistant against the aggressive ionizable (salt) filling, the niobium is fully protected from the salt filling by the electrode and the sealing compound 10, in the embodiment of FIG. 4 the sealing compound is Ruthenium-boride, i.e. $Ru_{0.85}B_{0.15}$ having a melting point of about 1900° C. and a coefficient of linear thermal expansion of about $6.5*10^{-6}$ $K^{-1}$. The excellent halide resistance of the sealing compound enables to manufacture a creviceless discharge vessel. The current feedthrough 20 as such does not comprise a halide-resistant portion. Hence, a relatively compact discharge vessel of a simple construction is obtained. The sealing part has a diameter of about 700 μm, and the sealing compound is provided as a layer in between the sealing part and the ceramic wall of the discharge vessel/end part, and has a layer thickness of about 85 μm.

In FIG. 5 the discharge vessel 3 has as an end part a non-protruding plug 34. Said plug 34 is fastened in a gastight manner in the cylindrical part by means of a shrink sintered joint S. The ceramic plug 34 narrowly encloses a current feedthrough 20 of a relevant electrode 4 having an electrode rod 4a, which is provided with a tip 4b. The electrode is directly mounted on a sealing part 40 which is made of a metal whose coefficient of linear expansion corresponds very well to that of the end plugs 34, in this case Molybdenum (Mo) because this material is relatively cheap and has a coefficient of thermal expansion enabling it to be sealed gastightly to the ceramic discharge vessel 3. As the coefficient of linear thermal expansion of Molybdenum, i.e. $5.0*10^{-6}K^{-1}$, does not very well match with the coefficient of linear thermal expansion of the ceramic wall, i.e. $7*10^{-6}K^{-1}$, a sealing compound 10 is provided in a layer thickness of about 200 μm. As the molybdenum is resistant against the aggressive ionizable (salt) filling, it need not to be fully protected from the salt filling by the sealing compound 10. In the embodiment of FIG. 4 the sealing compound is Ruthenium-boride, i.e. $Ru_{0.75}B_{0.25}$ having a melting point of about 1800° C. and a coefficient of linear thermal expansion of about $6.5*10^{-6}K^{-1}$ which is close to the average coefficient of linear thermal expansion of the ones of both translucent gastight aluminum-oxide and molybdenum, thus essentially reducing permanent mechanical stress levels in the lamp. The excellent halide resistance of the feedthrough construction and sealing compound enables to manufacture a creviceless discharge vessel. Hence, a relatively compact discharge vessel of a simple construction is obtained.

Figure 6:
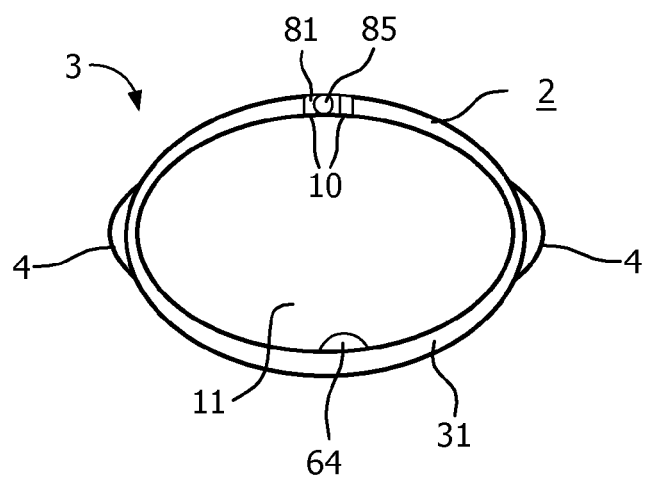
FIG. 6 shows a fourth embodiment of a discharge vessel according to the invention.

FIG. 6 shows a fourth embodiment of a discharge vessel 3 according to the invention comprising a ceramic body 2. The discharge vessel encloses with a wall 31 of the ceramic body a discharge space 11, said wall is provided with an opening 81 through which the discharge space is provided with an ionizable salt filling 64. After said filling is provided to the discharge space, the opening is closed with a stopper 85, in the figure made of TGA, for example $Al_2O_3$ with Mg, Er and/or Zr dopes. Said stopper has dimensions such that when accommodated in the opening it is both flush with the inner and outer wall of the discharge vessel, said stopper being sealed with sealing compound 10 in the opening using laser processing melting only the sealing compound and not the material of the ceramic wall. The sealing compound is a brazing alloy of Ru-boride. As said sealing compound is resistant to the (aggressive) ionizable filling at the relatively high temperatures at the wall during operation of the lamp, the sealing compound of the invention enables the manufacture of discharge vessels which are suitable for induction lamps. In the figure the discharge vessel provided with electrodes 4 which are not disposed in the discharge space but rather are located on the outside of the wall. The discharge vessel is free from any separate end part sealed to the ceramic body.

Figure 7A:
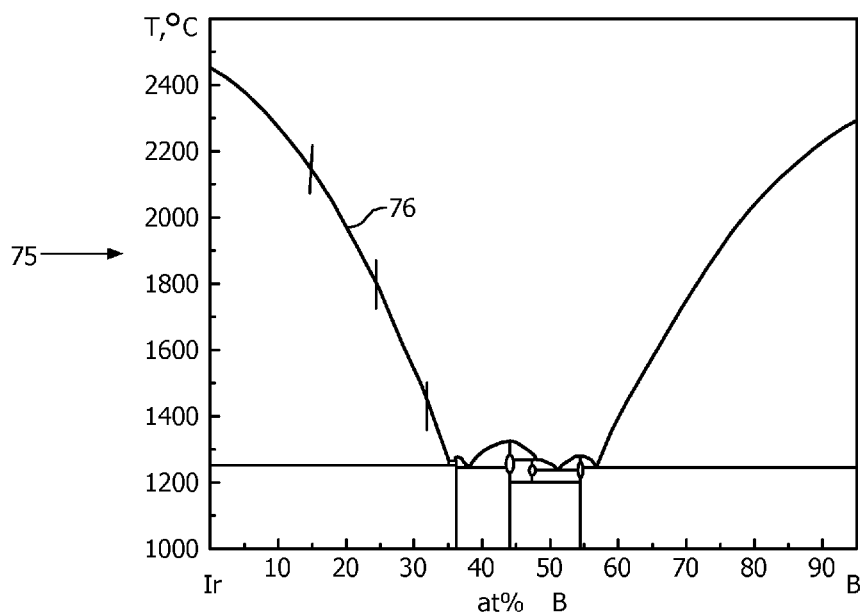
FIG. 7A-B shows phase diagrams of Ru-boride and respectively Ir-boride.
Figure 7B:
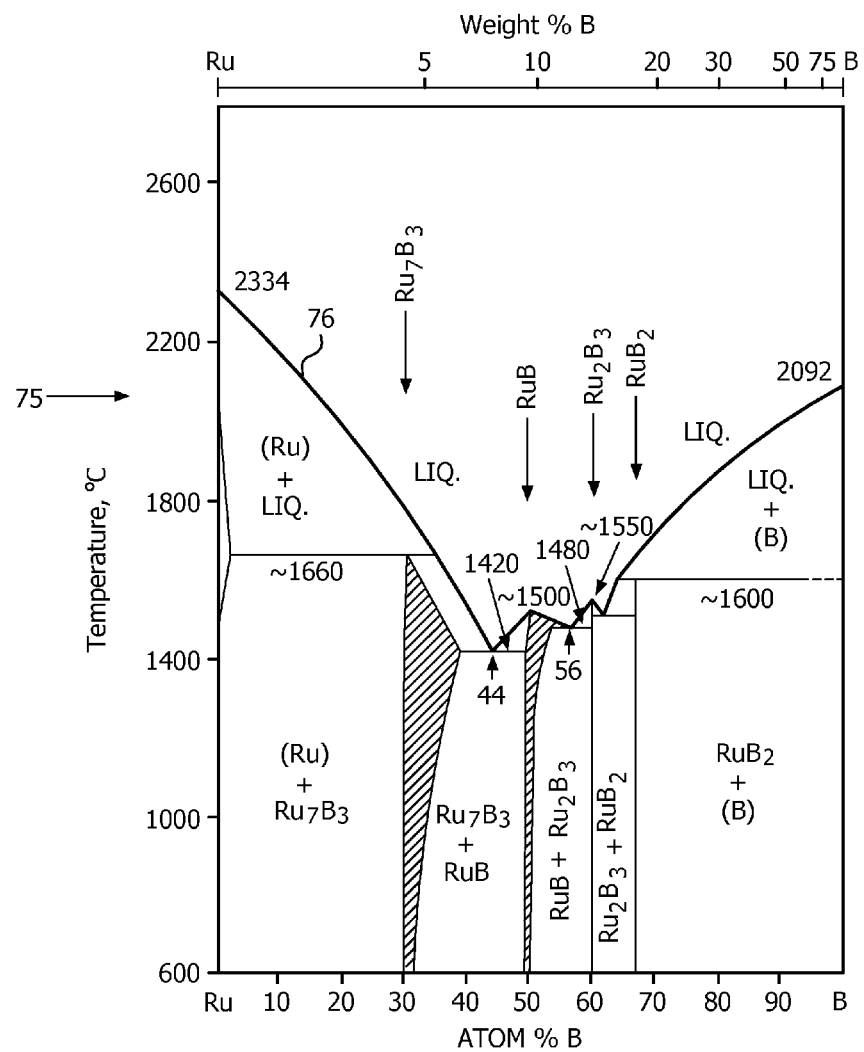

In FIGS. 7A and 7B phase diagrams 75 of Ru-boride and respectively Ir-boride are shown. Interesting part of the phase diagram is the liquidus curve 76 at the left, i.e. for metal-boride compounds with less than about 44 at % or less than 37 at % of the second component boron as too much boron in the compound involves the risk of diffusion of (too much of) said second component into the ceramic discharge vessel, said diffusion involves the risk of less resistance to corrosion of the discharge vessel by the lamp filling. To be on the safe side, the upper limit for boron therefore preferably is less than 40 at %. For compositions of the sealing compound with less than 40 at % boron the melting point of the sealing compound increases with decreasing boron amount. Hence, the desired melting temperature of the sealing compound can easily be chosen by selecting the ratio of first component and at least one second component. The coefficient of linear thermal expansion varies relatively only little, i.e. by at the most 10%, in said range.

EXAMPLE

Experiments with $Ir_xB_y$ were performed in 70 W T burners (see FIG. 3).

Ir powder is mixed with 3w % B-powder (corresponding to about 35.5 at % B) and small rings were pressed with a weight of about 14 mg.

70 W CDM T discharge vessels (external diameter discharge vessel 8.45 mm, wall thickness 0.8 mm, length discharge vessel body 13 mm, external diameter extended plug 2.63 mm, internal diameter extended plug 0.775 mm, length plug 14 mm, extended part of plug 12 mm) were sealed in a linear furnace. In the sealing process, the temperature of the furnace was increased in ~20 sec to 1625° C. and stayed ~25 sec at 1625° C.

A threefold feedthrough construction of Nb, Mo(W) and W electrode was used (diameter Nb 720 µm, length 15.50 mm, diameter Mo(W) rod 386 µm with Mo coil of 139 µm wire thickness (total diameter 664 µm), length 9 mm and a W electrode with rod of 300 µm diameter, length of 3 mm with coil (3.5 windings of 170 µm)).

The discharge vessel is filled with NTD salt (10 mg (composition in w %, Na I: 7%, TlI: 90%, $DyI_3$: 3%), 8.5 mg Hg and 200 mbar ArKr.

The lamp is operated in a vertical burning position in a 11 h on/1 h out mode. Operation time 1000 h and 90 on/off switches. Lamp voltage started at ~93V and slightly increased to ~99V over 500 h. Stable voltage at 99V for the next 500 h indicating no leakage of the seal. No blackening of the burner was observed in 1000 h lifetime of the lamp.

In comparison with modern state-of-the-art lamps having conventional features, lamps 1 according to the invention with one or more seals 10 show a similar or better behavior with respect to maintenance and stability of light-technical properties (color point), etc.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The invention claimed is:

1. A discharge vessel comprising a ceramic body enclosing a discharge space provided with an ionizable filling, the discharge space being sealed in a gastight manner with a sealing compound,
wherein the sealing compound comprises
at least one first component selected from the group consisting of ruthenium (Ru), Osmium (Os), and Rhenium (Re), and
at least one second component selected from the group consisting of silicon (Si), boron (B), and phosphorus (P).

2. The discharge vessel of claim 1, further comprising:
an end part sealed to the ceramic body, and
an electrode mounted on an electrode feedthrough, said feedthrough being sealed in said end part with the sealing compound, the electrode extending from the end part into the discharge space.

3. The discharge vessel of claim 2, wherein the feedthrough comprises a sealing part comprising a metal selected from the group consisting of niobium (Nb), molybdenum (Mo), rhenium (Re), tungsten (W), tantalum (Ta), and Iridium (Ir).

4. The discharge vessel of claim 3, wherein the sealing part comprises niobium (Nb), molybdenum (Mo), or rhenium (Re).

5. The discharge vessel of claim 2, wherein the discharge vessel is free from a crevice along the feedthrough.

6. The discharge vessel of claim 2, wherein the discharge vessel is free from an extending plug at the end part.

7. The discharge vessel of claim 3, wherein a coefficient of linear thermal expansion of the sealing compound (E) is $\pm 0.5 \ast 10^{-6} K^{-1}$ of an average of a coefficient of linear thermal expansion of the ceramic body and a coefficient of linear thermal expansion of the sealing part.

8. The discharge vessel of claim 3, wherein the sealing part is in one part and extends between the electrode and an external contact.

9. The discharge vessel of claim 1, wherein the ceramic body comprises an opening, the opening being sealed with the sealing compound.

10. The discharge vessel of claim 1, wherein the sealing compound is a brazing alloy selected from the group consisting of:
ruthenium-boride ($Ru_xB_z$), and
ruthenium-iridium-boride ($Ru_xIr_yB_z$),
wherein $x+y+z=1$.

11. The discharge vessel of claim 10, wherein z is $\geq 0.2$ atomic fraction and $\leq 0.4$ atomic fraction.

12. The discharge vessel of claim 11, wherein the sealing compound is $Ru_{0.65}B_{0.35}$, or $Ru_{0.75}B_{0.25}$.

13. The discharge vessel of claim 1, wherein a coefficient of linear thermal expansion of the sealing compound (E) is $\geq 6.5 \ast 10^{-6} K^{-1}$ and $\leq 7.0 \ast 10^{-6} K^{-1}$ over a temperature range of 25° to 300° C.

14. An electric lamp comprising:
at least two external electrical contacts, and
the discharge vessel of claim 1, wherein the discharge vessel further comprises at least two electrodes, each electrode connected to one of the at least two external electrical contacts.

15. A method for sealing a discharge vessel having a ceramic body enclosing a discharge space provided with an ionizable filling, the method comprising:
applying a sealing compound to the ceramic body to seal the discharge space in a gastight manner, said sealing compound comprising
at least one first component selected from the group consisting of ruthenium (Ru), Osmium (Os), and Rhenium (Re), and
at least one second component selected from the group consisting of silicon (Si), boron (B), and phosphor (P).

* * * * *